United States Patent Office 2,759,944
Patented Aug. 21, 1956

2,759,944
DERIVATIVES OF CARBOXYLIC ACID HYDRAZIDES AND METHOD OF MAKING THEM

Willy Logemann, Milan, Italy, assignor to Carlo Erba S. p. A., Milan, Italy, a firm No Drawing. Application March 30, 1953,
Serial No. 345,700

Claims priority, application Germany April 21, 1952

5 Claims. (Cl. 260—295)

It is known that the hydrazides of carboxylic acids are very important for human medicine. Thus in the German Patent No. 632,257 a process has been described for the preparation of the corresponding hydrazide from Pyrazin carboxylic acid, which is stated to be a very active analeptic.

Moreover isonicotinic acid hydrazide has become known which represents a great progress in the therapy of tuberculosis.

However, all these hydrazides are very toxic.

A method has now been developed by which these compounds can be transformed into compounds of slight toxicity, while maintaining their very remarkable therapeutic properties.

This is effected by transforming the hydrazides into the corresponding methanesulfonic acids, or into their alkali metal, alkaline earth metal or other non-toxic salts.

For this purpose the hydrazide is reacted with formaldehyde in the presence of bisulfites. It is possible to start from the aldehydo-bisulfite compound or the reagents can be reacted together. For example, the methanesulfonate of isonicotinic acid hydrazide can be obtained from isonicotinic acid hydrazide by heating with formaldehyde and sodium bisulfite.

This reaction may be represented as follows:

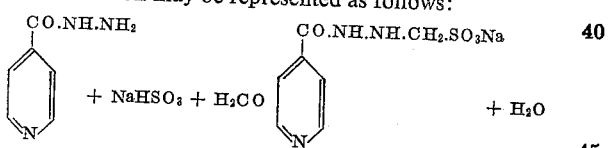

The compounds thus obtained are useful in therapy.

Example 1

6.85 g. of isonicotinic acid hydrazide are treated with 3.8 cm.³ of formaldehyde (39.3%) and 5.2 g. of sodium bisulfite dissolved in 10 cm.³ of water. This mixture is warmed for 4 hours on the steam bath. After a few minutes a clear yellow colored solution is formed. After this time the cooled solution is evaporated in a desiccator under vacuum. The crystalline residue is washed with a little ice-water and then recrystallized from a small amount of water.

Example 2

15.6 g. of calcium sulfite are suspended in 100 cm.³ of water and treated with 17 cm.³ of formaldehyde (35%). Into this suspension SO₂ is introduced. After a short time a solution is obtained. The excess of SO₂ is removed by introducing nitrogen. After addition of 27.4 g. of isonicotinic acid hydrazide, the mixture is heated for 4 hours. Then the solution is concentrated in a desiccator under vacuum at room temperature. Crystals of the calcium salt of the methanesulfonic acid of the isonicotinic acid hydrazide separate. (M. P. 215–220° C., decomposition.)

Example 3

137 g. of isonicotinic acid hydrazide are dissolved in 400 cm.³ of water and treated with 84 cm.³ of formaldehyde (35.8%); a precipitate separates and the reaction mixture is warmed.

Then 64 g. of gaseous SO₂ are introduced. The precipitate formed redissolves and another precipitate is obtained. Then the mixture is cooled and the separated methanesulfonic acid of isonicotinic acid hydrazide is filtered. (M. P. 187–189° C. with decomposition.)

Upon neutralization with soda solution the sodium salt described in Example 1 is obtained. (Decomposition point 164–167° C.) On treating with diethylethanolamine and procaine base the corresponding amine salts are obtained.

I claim:

1. A process for the preparation of compounds of the group consisting of the methanesulfonic acid of isonicotinic acid hydrazide of the formula

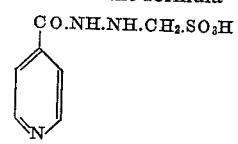

and salts thereof which comprises heating isonicotinic acid hydrazide with formaldehyde and a compound selected from the group consisting of sulfurous acid and the alkaline earth metal acid salts thereof.

2. Compounds of the general formula

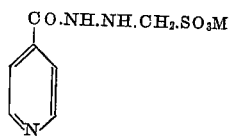

wherein M is a non-toxic cation selected from the group consisting of hydrogen, alkali metals, alkaline earth metals, lower dialkylethanolamines and procaine.

3. The sodium salt of the methanesulfonic acid of isonicotininc acid hydrazide of the formula

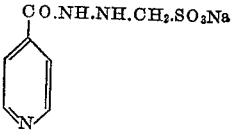

4. The calcium salt of the methanesulfonic acid of isonicotinic acid hydrazide of the formula

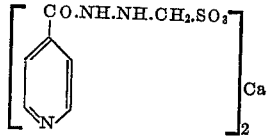

5. The methanesulfonic acid of isonicotinic acid hydrazide of the formula

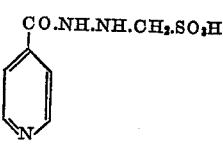

References Cited in the file of this patent
UNITED STATES PATENTS 2,628,237    Fox   ----------------- Feb. 10, 1953